Figure 1:
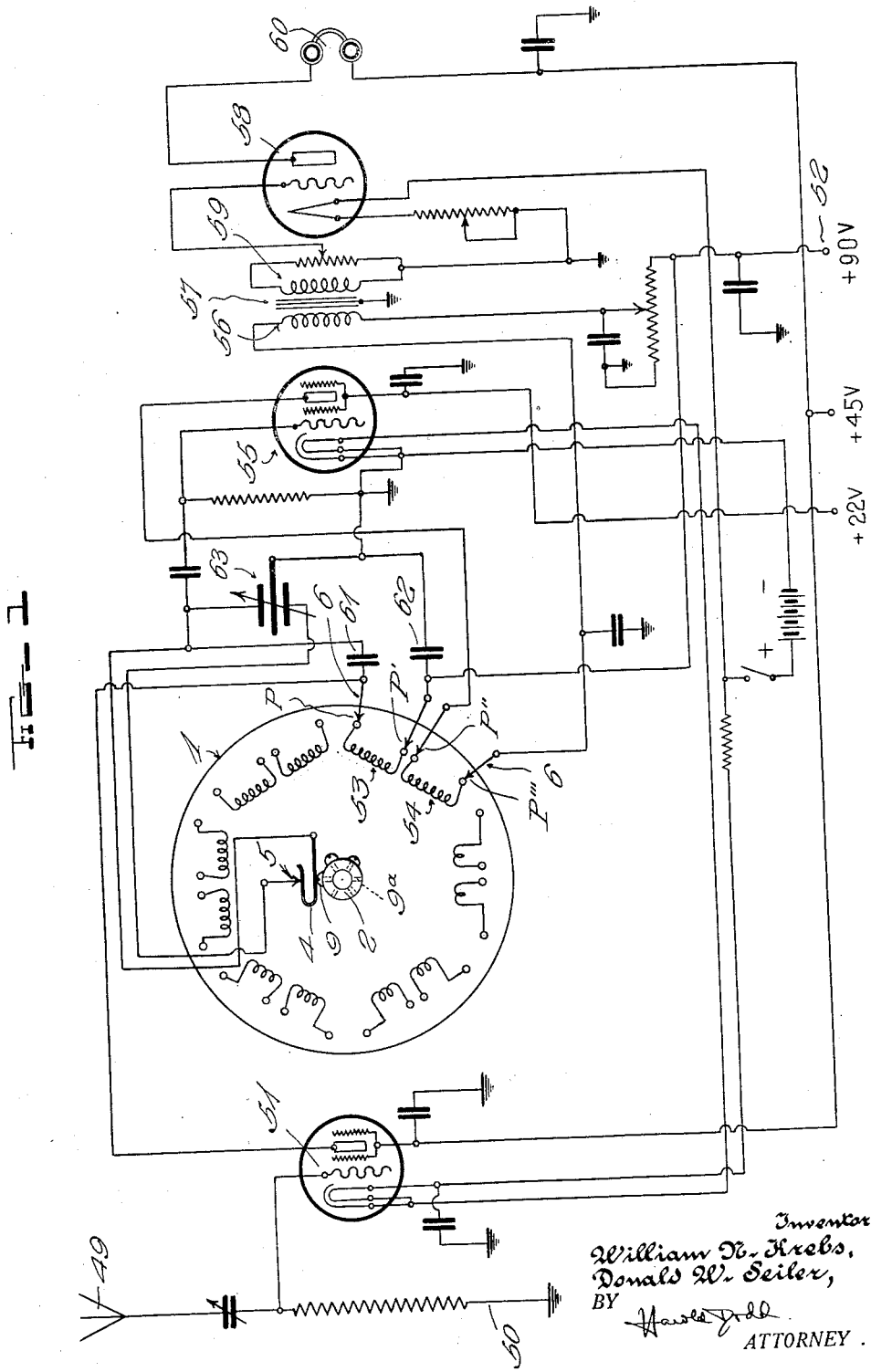

Aug. 15, 1939.    W. N. KREBS ET AL    2,169,257
MULTIFREQUENCY SIGNALING APPARATUS
Filed May 24, 1930    6 Sheets-Sheet 4
FIG. 4
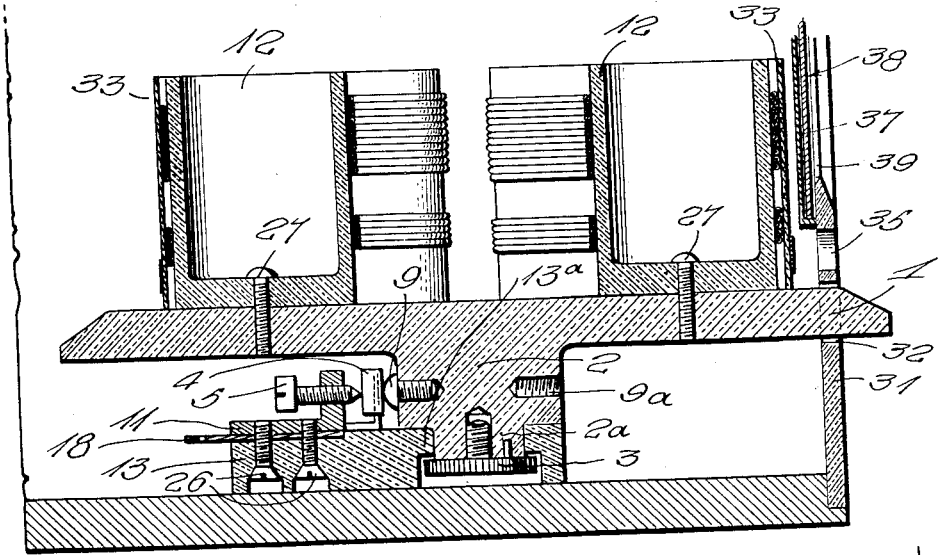
FIG. 5
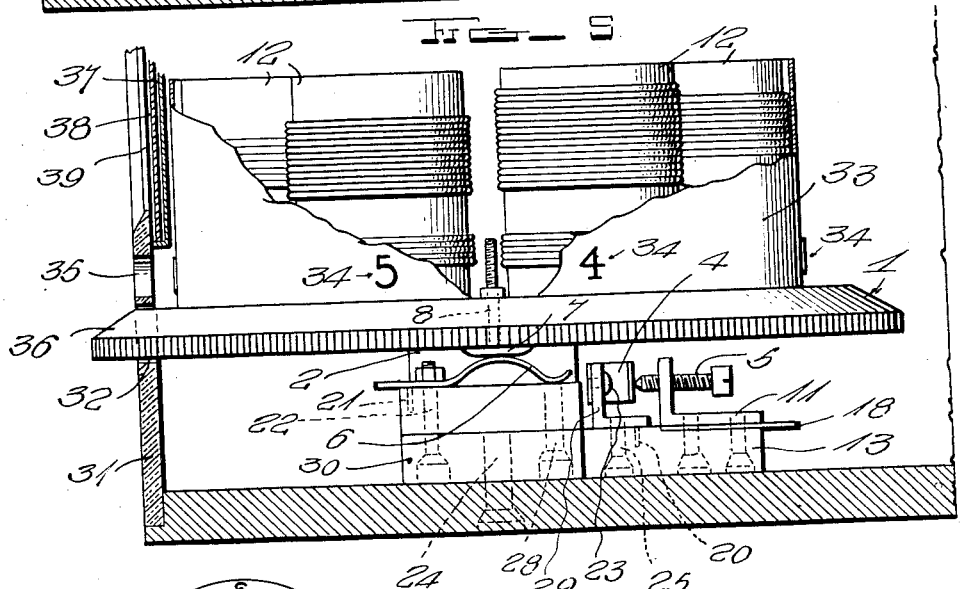
FIG. 6
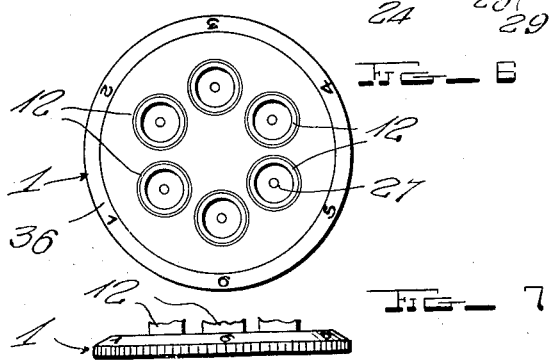
FIG. 7
Inventors
William N. Krebs,
Donald W. Seiler,
BY Harold Todd
ATTORNEY.

Aug. 15, 1939.                W. N. KREBS ET AL                2,169,257
MULTIFREQUENCY SIGNALING APPARATUS
Filed May 24, 1930                6 Sheets-Sheet 5
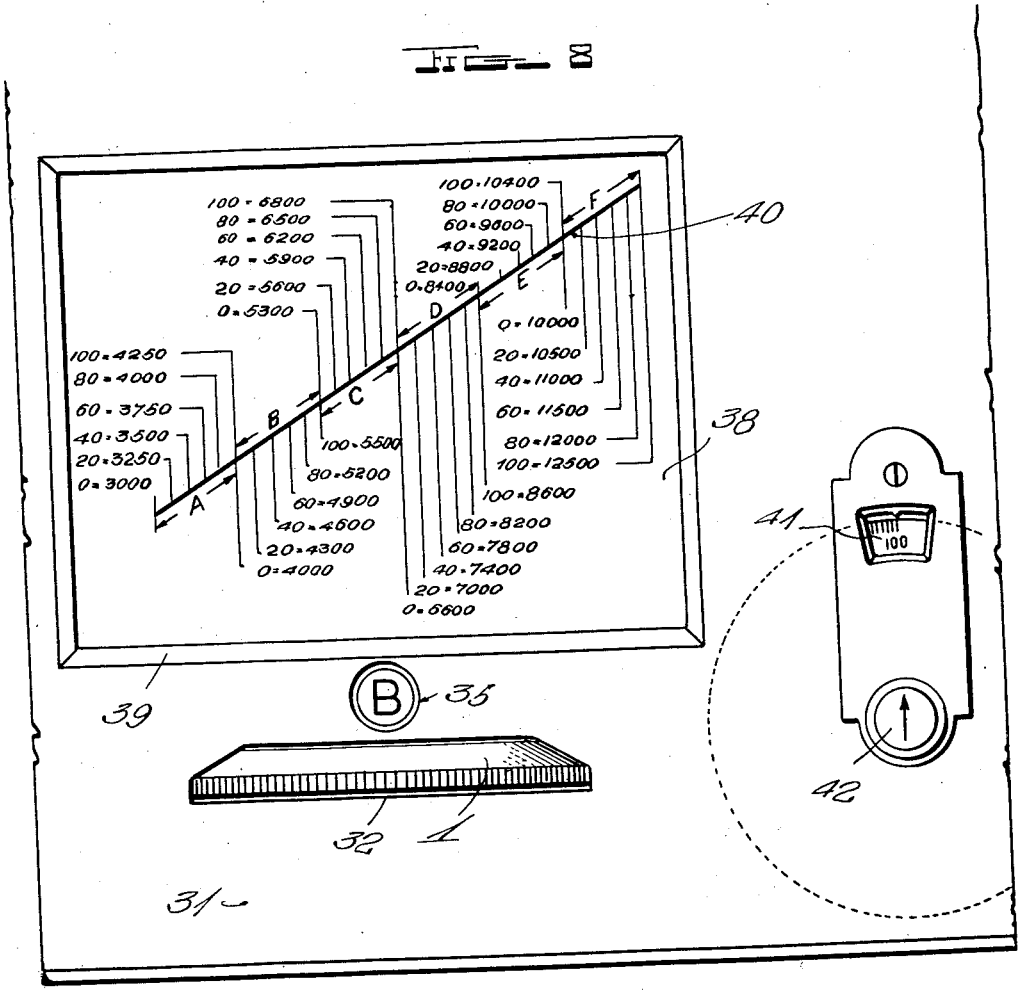
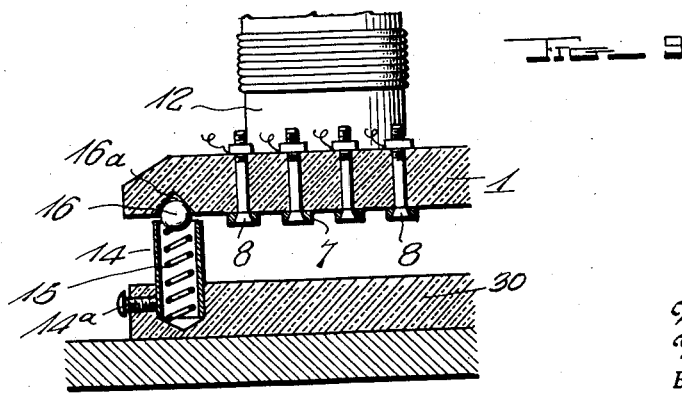
Inventors
William N. Krebs,
Donald W. Seiler,
BY Harold Todd
ATTORNEY.

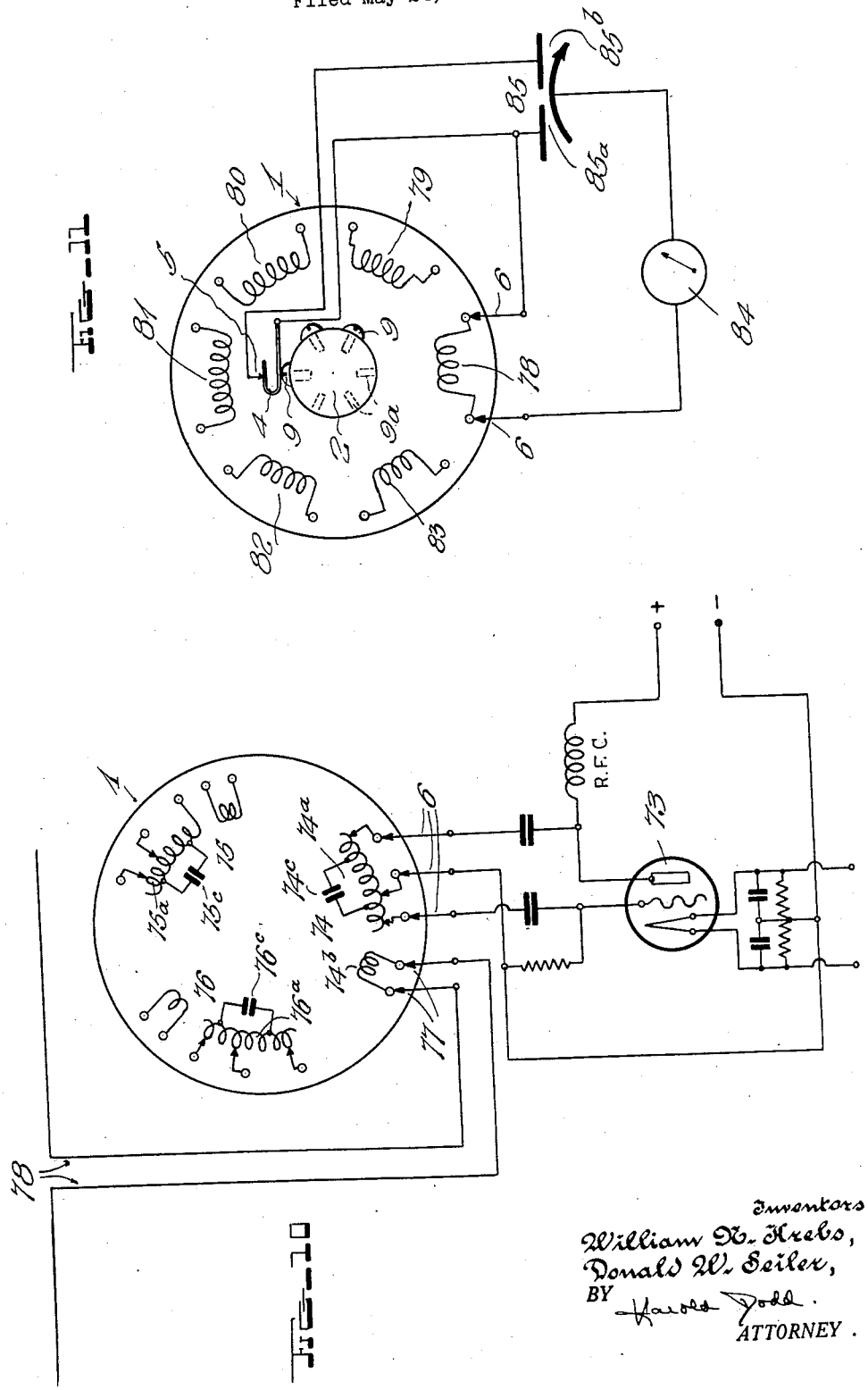

Patented Aug. 15, 1939

2,169,257

UNITED STATES PATENT OFFICE 2,169,257

MULTIFREQUENCY SIGNALING APPARATUS

William N. Krebs, Baltimore, Md., and Donald W. Seiler, Washington, D. C.

Application May 24, 1930, Serial No. 455,399

4 Claims. (Cl. 250—40)

(Granted under the act of March 3, 1883, as amended April 30, 1928; 370 O. G. 757)

Our invention relates broadly to high frequency electrical systems and more particularly to means for changing the operating frequency of a high frequency electrical system.

One of the objects of our invention is to provide a high frequency electrical system having means for controlling the operating frequency in successive steps, the frequency change system being designed with a high degree of efficiency.

Another object of our invention is to provide a construction of tuning apparatus for a high frequency electrical system arranged to readily select desired values of inductance or capacity for cooperation in a high frequency electrical circuit.

Still another object of our invention is to provide a construction of high frequency electrical apparatus having a step by step adjustment for readily changing the operating frequency of an electrical circuit while maintaining the efficiency thereof at maximum, a particular value of inductance being related to a particular range of capacity for enabling the electrical circuit to be adjusted to intermediate frequencies within the range of the selected inductance for rendering the associated circuits responsive to a particular frequency.

A further object of our invention is to provide a construction of tuning apparatus for high frequency electrical circuits wherein a multiplicity of inductance units of selected values are carried by a revolvable disk or turntable which may be selectively moved to different angular positions for rendering a selected inductance effective in cooperation with a particular range of capacity whereby an associated electrical circuit may be adjusted to resonance for any one of a multiplicity of frequencies within a band of frequencies in the range of the inductance and associated tuning capacity.

The apparatus of our invention has many applications and may be employed for controlling the circuits of a radio receiving system, for the adjustment of the circuits of a radio transmitter, for adjusting the frequency of a heterodyne receiver or frequency meter and in many other high frequency electrical circuits.

Figure 2:
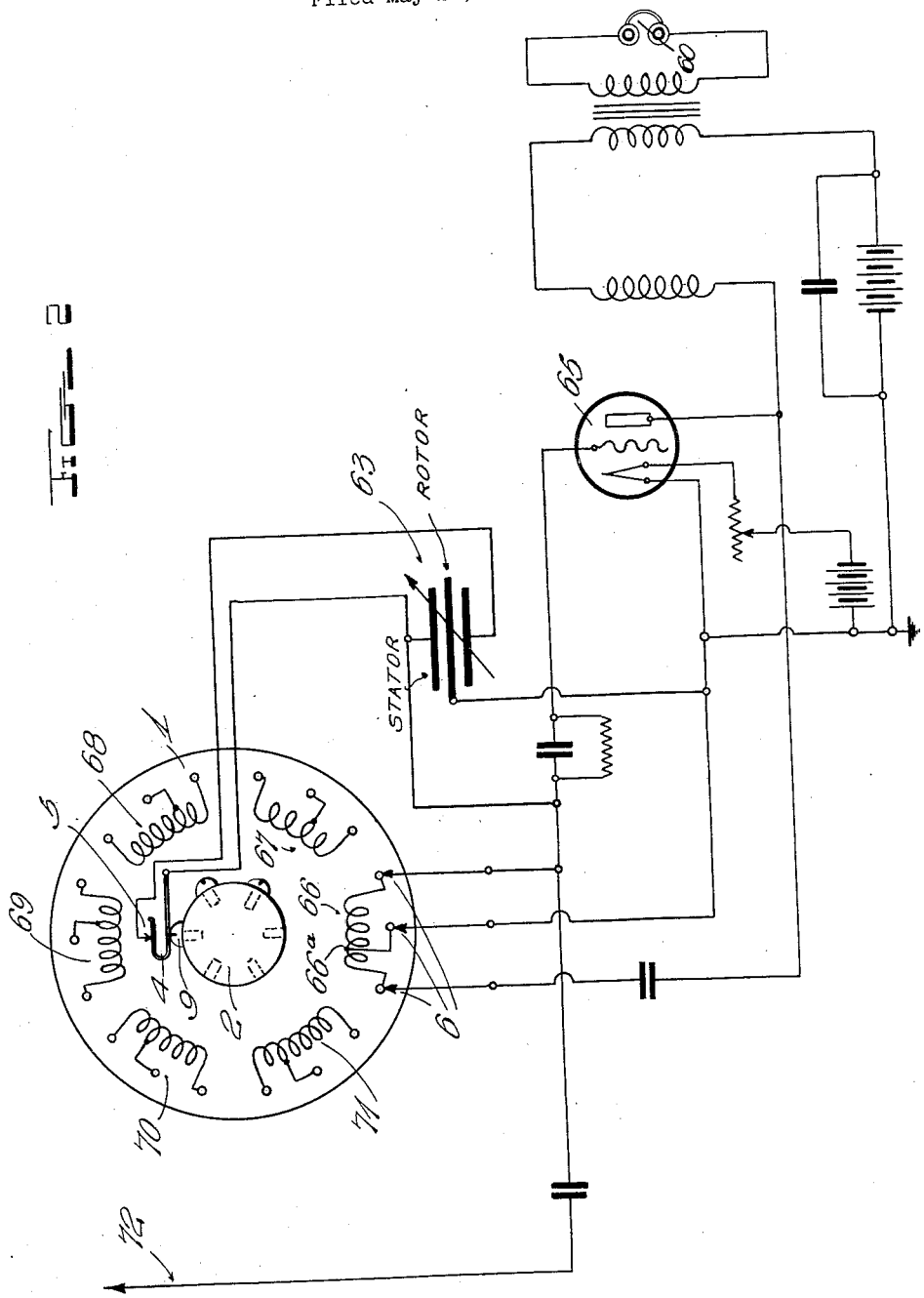
Figure 3:
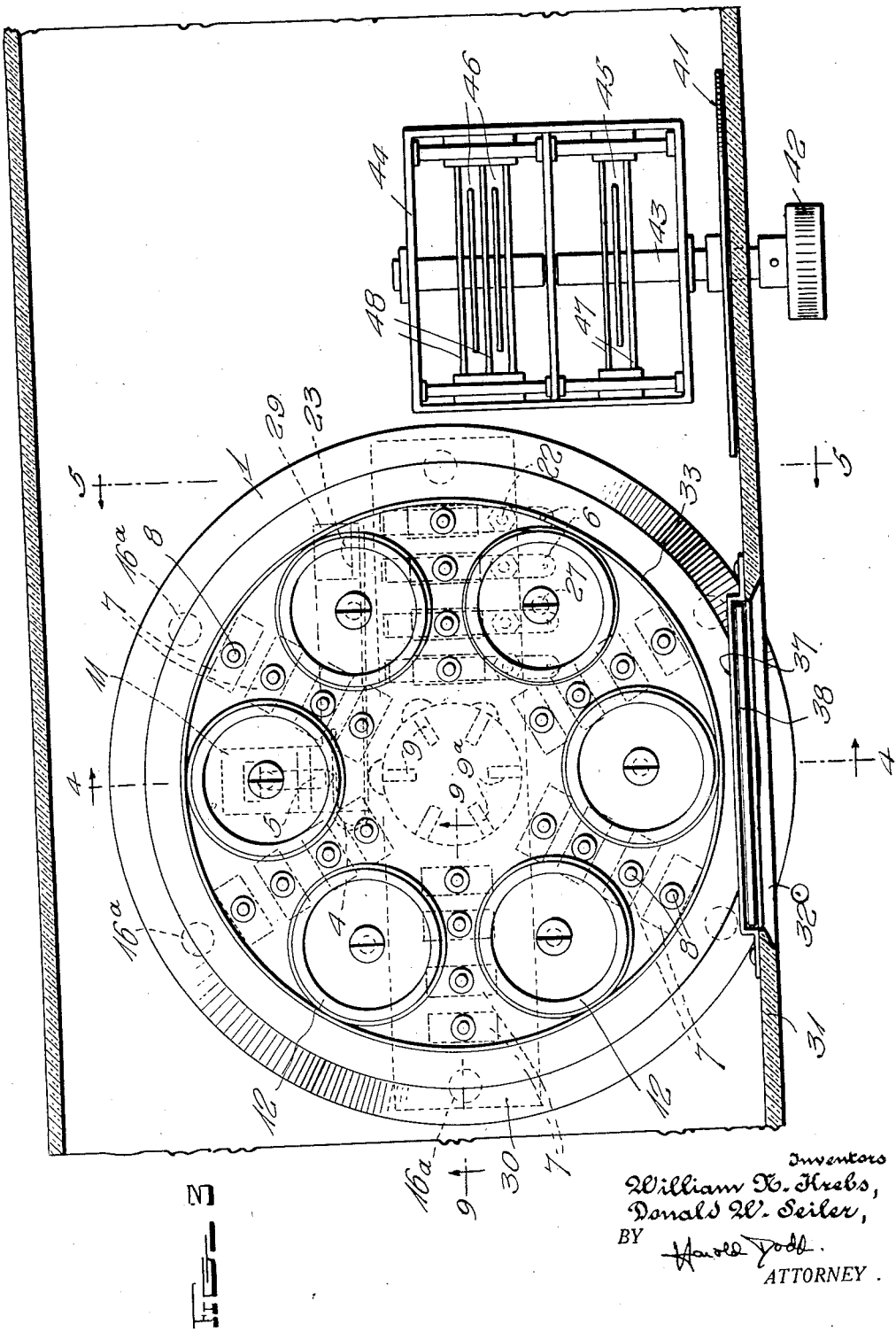

Our invention will be more fully understood from the specification hereinafter following by reference to the accompanying drawings, in which:

Figure 1 diagrammatically illustrates the application of the frequency adjusting apparatus of our invention to a radio receiving circuit; Fig. 2 diagrammatically illustrates the apparatus of our invention connected in the circuit of a radio receiver or heterodyne frequency meter; Fig. 3 is a plan view of the frequency changing apparatus of our invention; Fig. 4 is a vertical cross-sectional view through the tuning apparatus on line 4—4 of Fig. 3; Fig. 5 is a side elevation of the tuning apparatus partially broken away, the view being taken on line 5—5 of Fig. 3; Fig. 6 is a plan view of a modified form of rotatable disk carrier for the inductance units employed in the structure of our invention; Fig. 7 is a side elevation of the rotatable carrier shown in Fig. 6; Fig. 8 is a front view of a portion of the panel of a high frequency receiving apparatus employing the tuning apparatus of our invention; Fig. 9 is a fragmentary cross-sectional view taken through a portion of the rotary disk constituting the tuning apparatus of our invention on line 9—9 of Fig. 3; Fig. 10 shows the application of the apparatus of our invention to a radio transmission circuit; and Fig. 11 illustrates an application of our invention to a radio frequency meter.

In order that the principles of the apparatus of our invention may be clearly understood we shall illustrate the application with the invention particularly in connection with a short wave radio receiving apparatus. The tuning system of our invention has been found particularly efficient in the operation of high frequency receiving circuits within a range of 3,000–18,000 kilocycles. In order to cover this frequency range we provide a rotatable carrier on which there is mounted individual inductance coils, the separate inductance coils being wound to cover different frequency ranges. The rotatable carrier is provided with an associated cam mechanism by which suitable values of variable capacity may be selectively related to the inductance units on the rotatable carrier for adjusting the associated signal receiving circuit to resonance for a particular frequency within the band of frequencies to which the inductance and related capacity may be responsive. The rotatable carrier may be angularly shifted to move one inductance unit out of connection with the signal receiving circuit while another inductance unit is moved into connection with the signal receiving circuit, at the same time that a corresponding change is produced in the effective capacity which is cooperatively related to the inductance in the signal receiving circuit.

Referring to Fig. 1 of the drawings, the rotatable carrier has been indicated by reference character 1. The carrier is constructed from insulation material offering a high degree of insulation against leakage of high frequency current. The rotatable carrier 1 has a depending hub 2 which extends through the insulated supporting member 13. The insulated hub 2 is reduced in cross-section as represented at 2a at the point where the hub passes through the insulated supporting member 13 and is provided with a removable flange screw device 3 locked in position in the hub 2. The flanged screw device 3 has the head thereof extending laterally beneath the inwardly directed portion 13a of the insulated supporting member 13 so that the rotatable disk or carrier 1 is readily revolved with respect to the insulated supporting member 13 while being confined to a pivotal position with respect to the insulated supporting member 13. The insulated hub portion 2 is drilled radially inwardly as indicated at 9a and tapped to receive the machine screws 9 which serve as cam devices. A bracket member 11 is mounted upon insulated supporting member 13 and carries a contact screw 5 therein adapted to establish connection with the brush 4 when the cam 9 moves the brush 4 from a position out of contact with the adjustable contact member 5 to a position establishing contact therewith. Brush 4 is riveted or otherwise secured to bracket member 29 as indicated at 23 and is sufficiently resilient to be moved under control of cam 9 and to be restored to position when cam 9 is no longer acting on the brush 4. A variable capacity system may thus be automatically cut into the signal receiving circuit as will be more fully hereinafter described.

The carrier 1 supports a multiplicity of separate inductance units which we have indicated generally at 12 as being constituted by an upstanding tubular member having coils wound thereon, the tubular member being secured to the disk 1 by screw devices shown at 27. Connections are taken from each inductance unit to terminal posts 8 which pass through the insulated carrier disk 1 and connect with the metallic contact shoes 7 on the underside of the rotatable carrier 1. A set of stationary metallic contact brushes 6 are carried by insulated block 30. A resilient contact member 6 is arranged in alignment with each of the contact shoes 7 leading from the inductance units. Each contact member 6 is maintained in accurate alignment with the contact shoes 7 by means of the securing screws 22 which pass through block 30 and by means of pins 21 depending from each contact brush 6 by which displacement of the contact brush 6 out of alignment with the contact shoes 7 is prevented. Block 30 is secured to the base of the apparatus by means of screw 24. The upper portion of block 30 is secured in alignment with the lower portion thereof by screws 22 and 28 as indicated.

The rotatable disk 1 is shiftable to a plurality of positions by sliding the peripheral edge 1 with respect to the panel 31 at the position where the peripheral edge of the disk 1 projects through the slots 32 in the panel 31. Each inductance unit may be moved to such a position that the contact shoes 7 thereof establish wiping contact with the contact clips 6. The alignment of particular inductance units in proper position to establish connection between contact shoes 7 and the contact clips 6 is assured by the detent device 16 which is carried by one end of the block 30 as shown in Fig. 9. A tubular member 14 is erected vertically in a recess in insulated block 30 and is secured therein by a suitable set screw 14a. A spring 15 is enclosed by tubular member 14 and tends to constantly urge ball 16 to a seat in the depressions or recesses 16a in the underside of the rotatable disk 1. By properly locating the recesses 16a at each point around the periphery of the disk 1 where it is desired to bring the disk 1 to a stop, an angular movement may be imparted to the disk 1 and the disk brought to rest as the ball 16 rides into the depression 16a in the underside of the disk 1 at each angular position thereof where the rotatable disk must be brought to rest. In order to change the frequency, the rotatable disk is given a peripheral force which dislocates the ball 16 from the depression 16a enabling the rotatable disk to be set in the next succeeding position. The sets of contact shoes 7 are successively brought into alignment with the resilient contact members 6 for completing connections from a particular inductance unit to the associated circuits of the signal receiving system.

Referring to Fig. 3, and to Figs. 4, 5 and 9, referenced on Fig. 3, it will be noted that the contact members 6 are disposed radially on one side of the hub 2 and bear on the contacts 7 on carrier 1 in a direction parallel to the axis of the hub. To balance the lateral stresses imposed thereby on the hub, the latching means 14—16, Fig. 9, is disposed in diametrically aligned position on the opposite side of the hub 2 and arranged to bear on the carrier in a direction parallel to the hub and to the direction of force of contact members 6. The degree of resiliency in the contact members 6 and in the spring 15 of the latching means is selected so that substantially no transverse forces are resolved axially of the hub 2 and are resisted by the flange on the retaining member 3, Fig. 4, or by the weight of the rotatable assembly which is substantially balanced with respect to the hub axis. The equilibrium thus afforded contributes to the ease of operation and long life of the device.

To provide an indication of the particular inductance which is effective in the signal receiving circuit the several inductance coil supports indicated at 12 may be surrounded by an indicator card 33 on which there are printed letters, numbers or other characters indicated at 34 for designating the particular coil having its terminals registered with the resilient contacts 6, as viewed through an aperture 35 in the panel 31 of the receiving apparatus as shown in Fig. 8.

Reference numerals as indicated in Fig. 5 may be employed or letters as indicated in Fig. 8 may be employed. The indicating marks may be placed upon the peripheral edge 36 of the rotatable carrier 1 thereby eliminating the necessity for a sighting aperture in the panel 31. In order to advise the operator with respect to the position at which tuning must be effected for a particular inductance coil for the reception of a given signaling frequency, we mount a calibration table directly behind the panel 31 as represented at 37 in such manner that the calibration chart or card 38 may be readily viewed by the operator through the frame 39 cut in the panel 31. As shown in Fig. 8, the chart consists of a curve having substantially a straight line characteristic indicated at 40 where the curve is divided into sections A, B, C, D, E and F, designating the different inductance coils mounted on the rotatable carrier 1. Each section of the curve is broken up by calibrations designating readings on the variable condenser dial 41 which are required for the reception of a particular frequency. For example with the setting which has been illustrated using B coil with the condenser set on 100 the circuit will respond to 5500 kilocycles. The variable condenser is controlled by knob 42 which is secured to operating shaft 43 which extends through the variable condenser frame 44 and is journaled therein for moving the sets of rotor plates designated at 45 and 46. The rotor plates are interleaved with sets of stator plates indicated at 47 and 48.

While we have illustrated only two cooperating sets of variably related plates covering different frequency ranges it will be understood that any number of sets of plates may be employed. Under operating conditions one set of cooperatively related rotor and stator plates may be employed in connection with a particular inductance unit, while under other conditions two or more sets of plates will be employed according to the operation of the automatic switch mechanism controlled by cam 9, movable contactor 4 and contact 5.

Referring to the circuit arrangement of Fig. 1, the antenna ground circuit for the receiving system is represented by reference characters 49—50. A coupling tube 51 is connected in the antenna circuit and the output circuit connected to two of the fixed contacts 6 beneath the rotatable carrier 1. A connection from the plate circuit of tube 51 leads to the fixed contact strip 6 which we have designated by the letter P. The fixed contact strip 6, identified by reference P', leads to the high potential source at binding post 52. The low potential end of the plate supply system returns to the cathode circuit of the tube system in the usual manner. This arrangement effectively places the primary winding 53 of one of the inductance units 12 in the output circuit of the coupling tube 51. The secondary winding 54 which is permanently coupled to primary winding 53 is automatically connected through fixed contact strips 6 with terminals P'' leading to the plate electrode of the electron tube 55 while terminal P''' leads to the primary winding 56 of the audio frequency coupling transformer 57 in the output circuit of tube 55 by which the output energy from tube 55 is transferred to the input circuit of amplifying tube 58 through secondary winding 59 for the operation of a suitable responsive device indicated at 60. The input circuit of tube 55 is electrostatically coupled with the output circuit of coupling tube 51 through condensers 61 and 62. The input circuit of tube 55 is tuned by variable condenser system 63 constituted by sets of stator and rotor plates as indicated physically at 45—47 and 46—48 in Fig. 3. The different sections of the variable condenser system 63 are rendered effective by means of switch 4 and contact 5 under control of cam 9. In the position shown, cam 9 has closed switch 4 with respect to contact 5. As a result all of the condenser sections are effective so that a larger capacity is placed effectively across winding 53 rendering the circuit responsive to any selected frequency within the range of frequency to which winding 53 is responsive. The feedback of energy is controlled by the association of windings 53 and 54. When it is desired to change the frequency range of the circuit the rotatable carrier 1 is revolved which will bring a new set of windings into registry with terminals P, P', P'' and P'''. The several sets of coils are wound with different frequency characteristics for changing the frequency range of the receiving system.

In Fig. 2 our invention has been shown applied to the radio receiver or heterodyne frequency meter wherein the input and output circuits of the electron tube 65 are coupled by different inductance elements. In the arrangement shown the inductance element 66 serves to couple the input and output circuits of the tube 65. A tap 66a on winding 66 divides winding 66 into separate portions which are located in the input and output circuits of the tube system. Inductance elements 67, 68, 69, 70 and 71 may be substituted for inductance element 66 in coupling the input and output circuits of the tube system. The value of the related capacity 63 is controlled by the switching system 4—5 in a manner similar to the arrangement illustrated in Fig. 1. A responsive device 60 is controlled by the beat note produced by the interaction of the oscillations sustained by the circuits of tube 65 in the customary manner. A coupling member 72 is provided which leads to other radio circuits or source of high frequency energy.

In Fig. 10, we have illustrated our invention as applied to a radio transformer. Electron tube oscillator 73 has been illustrated in cooperation with the rotatable disk apparatus 1 of our invention. The disk 1 supports a multiplicity of transformers having coupled windings mutually related as indicated at 74, 75 and 76. The secondary winding 74b is connected to the terminals represented at 77, and connects to the doublet radiating system 78. The primary winding 74a connects to the circuits of the oscillator including electron tube 73. When it is desired to change the frequency at which the oscillator 73 oscillates, the rotatable disk 1 is revolved substituting the transformer windings 75 in place of the transformer winding 74 for operation of the transformer at a different frequency. Similarly transformer winding 76 may be substituted for transformer winding 74 for operation of the transformer at still a different frequency. It will be observed that each transformer system includes a permanently tuned primary winding, the primary winding 74a being tuned by condenser 74c; the primary winding 75a being tuned by condenser 75c and primary winding 76a being tuned by condenser 76c.

Each transformer system has different inherent frequency characteristics and hence different frequencies may be transmitted through the selected transformer system, according to the particular transformer which is rendered effective by movement of the rotatable disk 1.

In Fig. 11 we have illustrated our invention as applied to a radio frequency meter wherein the rotatable disk 1 carries inductance units 78, 79, 80, 81, 82 and 83, each having different frequency characteristics. By shifting the rotatable disk 1, the fixed contact springs 6 effectively include a selected inductance unit in circuit with the radio frequency meter 84 and in circuit with the variable condenser system 85. The portion 85a of the variable condenser system is arranged permanently in series with the radio frequency meter 84. The portion 85b of the variable condenser system may be connected in parallel or disconnected from the portion 85a of the variable condenser system by movement of the switch 4 with respect to contact 5. The cam 9 is inserted as necessary for cutting in or out a related capacity for the particular associated inductance.

The apparatus of our invention has proven highly practical in its construction and operation. The equipment has been operated with a high degree of efficiency over relatively wide tuning ranges.

While we have described our invention in certain applications and in certain preferred embodiments we desire that it be clearly understood that modifications may be made and that no limitations upon our invention are intended other than may be imposed by the scope of the appended claims.

The invention described herein may be manufactured and used by or for the Government of the United States of America for governmental purposes without the payment of any royalties thereon or therefor.

What we claim as new and desire to secure by Letters Patent of the United States is as follows:

1. In a high frequency electrical system, a rotatable disc member shiftable to different angular positions, a multiplicity of inductance units carried by said rotatable disc member, a high frequency electrical circuit terminating in fixed contacts adjacent one side of said rotatable disc member, contacts carried by said disc member in cooperative relation to said fixed contacts and connected with the inductance units, and a circuit maker and breaker including a stationary contact and a movable contact, the rotatable disc being provided with sockets corresponding in number to the inductance units, abutments removably mounted in said sockets to engage the movable contact and close the circuit breaker as the disc is rotated for modifying an associated electrical capacity in said high frequency electrical circuit for cooperative relation with a selected inductance unit.

2. Frequency changing apparatus comprising a rotatable carrier, a plurality of impedance elements of different frequency characteristics mounted upon said rotatable carrier and individually connected with electrical contacts disposed radially on one face of said rotatable carrier, a high frequency electrical circuit having terminals projecting into the path of the contacts on said carrier and arranged for coaction with the contacts of a selected one of said impedance elements, a hub member rotatable in accordance with the movement of said carrier, a switch device disposed adjacent said hub member, said hub member having a multiplicity of radially positioned sockets therein corresponding in number to the number of impedance elements on said carrier, said sockets being adapted to receive a pin member mounted therein for actuating said switch when a predetermined impedance element is connected in said high frequency electrical circuit, a capacity system, and means controlled by said switch for connecting a selected portion of said capacity system in said high frequency electrical circuit.

3. In a high frequency electrical system, a support, a disc having a hub rotatably connected with said support, a plurality of inductance units carried by said disc and spaced from each other circumferentially thereof, contacts carried by said disc in radial disposition on one side thereof and connected with cooperating inductance units, coacting fixed contacts carried by said support and arranged to coact with the contacts carried by said disc as the disc is turned and establish connection with a selected inductance unit, a circuit maker and breaker including a stationary contact carried by said support and a movable contact carried by the support between the stationary contact and hub, said hub having sockets formed therein corresponding in number to the inductance units, and abutments engaged in said sockets and projecting radially from the hub to engage said movable contact and force the same into engagement with said stationary contact to close the circuit maker and breaker as the disc is rotated and inductance units moved into a selected position.

4. In combination, a rotatable platform, a plurality of electrical devices mounted on said platform, a set of contacts individual to each of said devices and connected therewith mounted on said rotatable platform in radial alignment, separate contacts in each set being disposed in circumferential alignment, supporting means disposed normal to the axis of said rotatable platform and in spaced parallel relation thereto, a set of fixed resilient contact members mounted on said supporting means for coaction with each set of contacts carried by said platform as the platform is rotated, and resilient latching means mounted on said supporting means and including a resilient latching member engaged with said platform in balanced relation to the engagement of said resilient contact members therewith, said platform being recessed to receive said latching member in positions wherein said set of fixed contact members engages a selected set of the contacts mounted in said platform.

WILLIAM N. KREBS.
DONALD W. SEILER.